(12) United States Patent
Otten et al.

(10) Patent No.: US 9,017,211 B2
(45) Date of Patent: Apr. 28, 2015

(54) POWER SHIFT TRANSMISSION

(71) Applicant: Deere & Company, Moline, IL (US)

(72) Inventors: Ulrich Otten, Speyer (DE); Martin Schaller, Bad Koenig (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 14/352,086

(22) PCT Filed: Oct. 17, 2012

(86) PCT No.: PCT/EP2012/070542
§ 371 (c)(1),
(2) Date: Apr. 16, 2014

(87) PCT Pub. No.: WO2013/064371
PCT Pub. Date: May 10, 2013

(65) Prior Publication Data
US 2015/0031491 A1 Jan. 29, 2015

(30) Foreign Application Priority Data
Oct. 31, 2011 (DE) .......................... 10 2011 085 496

(51) Int. Cl.
*F16H 3/44* (2006.01)
*F16H 3/46* (2006.01)

(52) U.S. Cl.
CPC .......... *F16H 3/46* (2013.01); *F16H 2200/0034* (2013.01); *F16H 2200/2007* (2013.01); *F16H 2200/2035* (2013.01)

(58) Field of Classification Search
None
See application file for complete search history.

(56) References Cited

U.S. PATENT DOCUMENTS

| | | | | |
|---|---|---|---|---|
| 3,774,475 A | * | 11/1973 | Meysenburg et al. | 475/158 |
| 3,939,733 A | * | 2/1976 | Wetrich | 475/209 |
| 4,189,962 A | * | 2/1980 | Chung | 475/277 |
| 4,686,869 A | * | 8/1987 | Beim | 74/745 |
| 4,790,213 A | * | 12/1988 | Lasoen | 475/328 |

FOREIGN PATENT DOCUMENTS

| | | | | |
|---|---|---|---|---|
| DE | 4112330 A1 | * | 7/1992 | ............. B60K 17/08 |
| EP | 0054253 A1 | * | 12/1981 | ................ F16H 3/60 |
| FR | 1234378 | * | 10/1960 | ................ F16H 3/56 |

* cited by examiner

*Primary Examiner* — Dirk Wright

(57) ABSTRACT

The invention relates to a power shift transmission (10). The power shift transmission comprises an input shaft (18), a first output shaft (20) arranged coaxially to the input shaft (18), a planetary transmission (22) having a planet gear carrier (28), which is connected to the input shaft (18), and at least one dual-stage planetary gear set (30), the dual-stage planetary gear set (30) engaging on the input side with an input-side sun gear (52) and on the output side with an output-side sun gear (44) in each case, and at least two shift elements (24, 26). To produce a variable power shift transmission for several pairings of various operation modes, the first output shaft (20) can be connected to the output-side sun gear (44) of the dual-stage planetary gear set (30) by means of a first shift element (24) and the first output shaft (20) can be directly connected to the input shaft (18) by means of a second shift element (26), the input-side sun gear (52) of the dual-stage planetary gear set (30) being non-non-rotatably connected to a housing (12) of the power shift transmission (10).

9 Claims, 3 Drawing Sheets

POWER SHIFT TRANSMISSION

FIELD OF THE INVENTION

The invention pertains to a power shift transmission comprising an input shaft, a first output shaft arranged coaxially to the input shaft, a planetary transmission having a planet carrier, which is connected to the input shaft, and at least one stepped planetary set, wherein the stepped planetary set engages on the input side and the output side with a sun gear, and at least two shift elements.

BACKGROUND OF THE INVENTION

Power shift transmissions having various transmission ratios, in which the shifting between the different transmission ratios occurs as a function of the load or of a required driving speed, are known and have been used for many years particularly in the automobile industry.

Furthermore, it is known to design such transmissions in connection with planetary transmissions and clutches in a modular system, so that the power shift transmissions can be operated by an appropriate design and arrangement of the gear pairings of the planetary transmission in different operation modes, such as a fixed drive mode, a gear reduction mode or a reverse mode. Thus, power shift transmissions are used as a preliminary stage of a transmission in tractors produced by the agricultural machine manufacturer John Deere, which, depending on the design of a stepped planetary set can be operated in the fixed drive mode or reverse mode operation mode, or in the fixed drive mode or gear reduction mode operation mode. The mentioned transmission is characterized in that, in a first shifting operation, a clutch connected to an input shaft connects the input shaft to the output shaft, so that the transmission can be operated in the fixed drive mode, wherein the planetary transmission runs as a free wheel. In a second shifting, the clutch is released, so that the planet carrier is driven by the input shaft, and the planetary set rolls about a first sun gear that is connected to the driveshaft and that is driven by the planetary set. Depending on the arrangement of the planetary set or the design of the gear sets of the planetary set and the sun gears, the power shift transmission can be operated in the gear reduction mode or in the reverse mode.

Thus, a two-stage power shift transmission is provided that on the one hand is produced at high cost in terms of manufacturing technology, and on the other hand does not allow an additional operation mode, for example, a crawler gear mode, in the mentioned arrangement.

The problem underlying the invention is to provide a power shift transmission of the type mentioned in the introduction, by means of which the above-mentioned problems can be overcome.

SUMMARY OF THE INVENTION

In accordance with an aspect of the invention, a power shift transmission is designed so that, by means of a first shift element, the first output shaft can be connected to the output-side sun gear of the stepped planetary set, and, by means of a second shift element, the first output shaft can be directly connected to the input shaft, wherein the input-side sun gear of the stepped planetary set is non-rotatably connected to a housing part of the power shift transmission. The sun gears and the stepped planetary set are arranged in this manner so that as a result of the formation of three exchangeable gear sets of sun gears and stepped planetary set, at least four different operation modes can be operated, wherein in each case, in a formed gear set, two of the four operation modes can be operated by shifting the shift elements. Furthermore, an extremely compact arrangement is produced, which, in addition, can be manufactured using a simple design, since, inter alia, a hollow gear in the planetary transmission can also be entirely omitted, so that the cost of manufacturing steps is minimized. The term outlet-side here means that the sun gear is arranged on the side of the output shaft of the planetary set. The term inlet-side, on the other hand, means that the sun gear is arranged on the side of the input shaft of the planetary set. The compact arrangement, particularly the design of the output shaft and the construction elements of the power shift transmission connected thereto, furthermore represents a form with low inertias, which is easy to manufacture in terms of design, and as a result of which, in particular, the shift times for a synchronous transmission that can be coupled to the power shift transmission are also clearly reduced, or the shift performance or the shift behavior can be improved. Overall, this leads to clear increase in the efficiency in comparison to other power shift transmissions.

A direct connection of the output-side sun gear or of the input shaft (or of the planet carrier, which can be directly connected to the input shaft) to the first output shaft occurs in each case by closing the corresponding shift element, wherein for each operation mode of the power shift transmission, a respective shift element is connected. The term shift elements here and below, particularly in the claims, should be understood as synonymous with devices by means of which rotating transmission components can be brought in a rotatable connection to one another and separated again. In this regard, it is possible to use, for example, multi-disk clutches or dog clutches or the like.

The input-side sun gear is arranged coaxially to the input shaft, wherein the input shaft extends through the input-side sun gear. The input-side sun gear is non-rotatably connected to a housing part of the power shift transmission and it can be non-rotatably mounted, for example, to a hollow shaft that is mounted coaxially to the input shaft and firmly connected to the housing part, or itself firmly connected as a hollow gear with outer toothing to the housing part. Other arrangements are also conceivable here, as long as it is ensured that the input-side sun gear is non-rotatably connected to the housing part.

The first output shaft is here designed as a hollow shaft through which a second output shaft connected to the input shaft extends. The second output shaft is connected via a rigid clutch or a lock against rotation to the input shaft. The second output shaft can be used, for example, as a drive for a power take off gear or it can itself be designed as a power take off.

The first and the second shift elements are designed as clutches, wherein the clutches are non-rotatably connected on the input side to the output-side sun gear or to the planet carrier and on the output side to the first output shaft. By connecting the two clutch parts of one of the two clutches, that is to say by closing one of the two clutches, the first output shaft is thus connected to the output-side sun gear or to the planet carrier. Other arrangements are also conceivable here as long as it is ensured that the output-side sun gear or the planet carrier can be non-rotatably connected independently of one another by shift elements directly or indirectly to the first output shaft, and thus assume an operating state connected to the first output shaft or an operating state separated from the first output shaft.

The power shift transmission can be operated in at least four operation modes, wherein the operation modes include at least the following operation modes: fixed drive mode, gear reduction mode, crawler gear mode and reverse mode. The fixed drive mode is characterized by a transmission ratio of 1; i.e., the input shaft and the first output shaft rotate in the same direction and at the same rpm. The gear reduction mode is characterized by a transmission ratio that is slightly higher than 1, i.e., the input shaft and the first output shaft rotate in the same direction, but the first output shaft at a lower rpm. The crawler gear mode is also a gear reduction mode, but with a definite transmission ratio that is clearly higher than 1, for example, in a range between 9 and 10. This means that the input shaft and the output shaft rotate in the same direction, but the first output shaft at an rpm that is 9 to 10 times lower. Here, other ranges above or below the mentioned ones are naturally also possible. The reverse mode is characterized by a negative transmission ratio, i.e., the input shaft and the first output shaft rotate in different directions. In the case of agricultural machines, the reverse mode is usually in the region of n=−1.

The stepped planetary set and the sun gears can be designed so that the power shift transmission can be operated in the fixed drive mode or in the gear reduction mode. In this design, the planetary gear of the stepped planetary set that engages with the input-side sun gears is designed to be larger than the planetary gear of the stepped planetary set that engages with the output-side sun gear, wherein due to the connection of the first output shaft to the planet carrier or the output shaft (by closing the second and opening the first shift element), the power shift transmission can be operated in the fixed drive mode. By connecting the first output shaft to the output-side sun gear (by closing the first and opening the second shift element), the power shift transmission can be operated in the gear reduction mode.

The stepped planetary set and the sun gears can be designed so that the power shift transmission can be operated in the fixed drive mode or in the crawler gear mode. In this embodiment, the planetary gear of the stepped planetary set that engages with the input-side sun gear can be designed to be smaller than the planetary gear of the stepped planetary set that engages with the output-side sun gear, wherein by connecting the first output shaft to the planetary gear (by closing the second and opening the first shift element), the power shift transmission can be operated in the fixed drive mode. By connecting the first output shaft to the output-side sun gear (by closing the first and opening the second shift element), the power shift transmission can be operated in the crawler gear mode.

The stepped planetary set and the sun gears can be designed so that the power shift transmission can be operated in the fixed drive mode or in the reverse mode. In this design, the planetary gear of the stepped planetary set that engages with the input-side sun gear can be designed to be smaller than the planetary gear of the stepped planetary set that engages with the output-side sun gear, wherein by connecting the first output shaft to the planet carrier (by closing the second and opening the first shift element), the power shift transmission can be operated in the fixed drive mode. By connecting the first output shaft to the output-side sun gear (by closing the first and opening the second shift element), the power shift transmission can be operated in the reverse mode.

In accordance with another aspect of the invention, a powershift transmission is provided comprising an input shaft; a first output shaft arranged coaxially to the input shaft; and a planetary transmission having a planet gear carrier, which is connected to the input shaft, and a dual-stage planetary gear set, wherein the dual-stage planetary gear set has an input side with an input-side sun gear and has an output side with an output-side sun gear, and at least a first shift element and a second shift element; wherein the first output shaft can be connected to the output-side sun gear of the dual-stage planetary gear set by means of the first shift element and the first output shaft can be directly connected to the input shaft by means of a second shift element, wherein the input-side sun gear of the dual-stage planetary gear set is non-rotatably connected to a housing of the power shift transmission.

A direct connection of the output-side sun gear or of the input shaft to the first output shaft can be established in each case by closing a corresponding shift element of the first shift element and the second shift element, and for each operation mode of the power shift transmission, a shift element of the first shift element and the second shift element is closed in each case.

The input-side sun gear may be arranged coaxially to the input shaft and the input shaft may extend through the input-side sun gear.

The first output shaft may be designed as a hollow shaft through which a second output shaft connected to the input shaft extends.

The first shift element may be a clutch and the second shift element may be a clutch, and the clutches on their input side maybe non-rotatably connected to the output-side sun gear or maybe non-rotatably connected to the planet gear carrier, and wherein the clutches on their output side maybe non-rotatably connected to the first output shaft.

The power shift transmission may be operated in at least four operation modes, wherein the at least four operation modes comprise a fixed drive mode, a gear reduction mode, a crawler gear mode, and a reverse mode.

The dual-stage planetary gear set, the input-side sun gear, and the output-side sun gear may be designed so that the power shift transmission can be operated in the fixed drive mode or in the gear reduction mode.

The dual-stage planetary gear set, the input-side sun gear and the output-side sun gear may be designed so that the power shift transmission can be operated in the fixed drive mode or in the crawler gear mode.

The dual-stage planetary gear set the input-side sun gear, and the output-side sun gear may be designed so that the power shift transmission can be operated in the fixed drive mode or in the reverse mode.

In reference to the drawings, which show different embodiments of the invention, the invention as well as additional advantages and advantageous variants are described and explained in greater detail below.

DETAILED DESCRIPTION OF THE PREFERRED EMBODIMENTS

Figure 1:
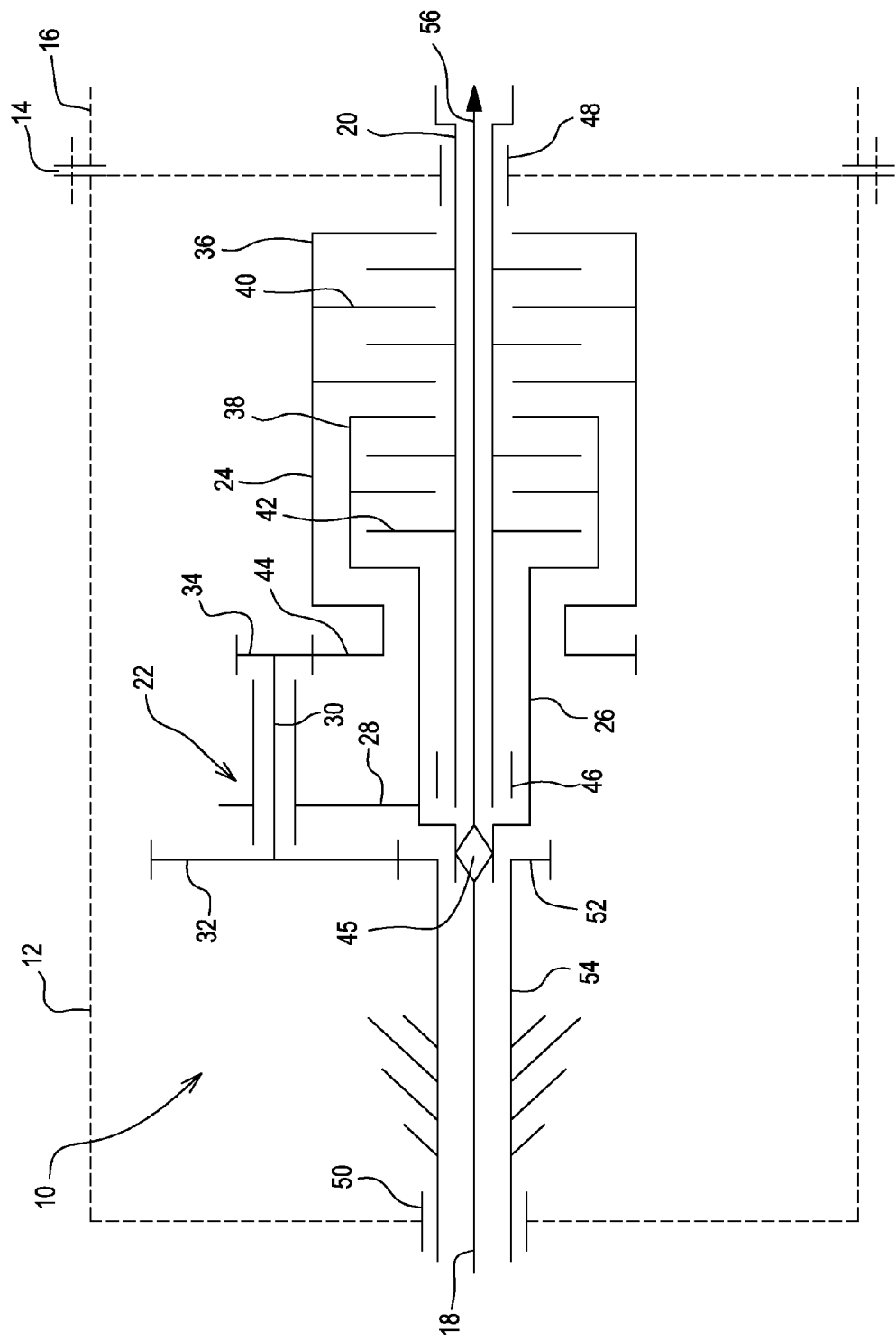
FIG. 1 shows a transmission diagram for a power shift transmission according to the invention in a first embodiment.

The power shift transmission 10 represented in FIG. 1 is designed as a variable modular transmission system and it includes a housing 12, which can be flange-mounted, for example, by means of a flange connection 14 to a main transmission housing 16, and which can be combined with a main transmission module (not shown) of an agricultural vehicle, for example, of a tractor or a tugboat.

The power shift transmission 10 comprises an input shaft 18 and a first output shaft 20, which can be brought into a drive connection by means of a planetary transmission 22 as well as by means of a first shift element 24 and a second shift element 26, which are both shown herein as clutches.

The planetary transmission 22 has a planet gear carrier 28, on which a dual-stage planetary gear set 30 is rotatably mounted. The dual-stage planetary gear set 30 comprises an input-side planet gear 32 as well as an output-side planet gear 34.

The first shift element 24 and the second shift element 26 are each designed as multi-plate clutches and each has a clutch housing portion 36 or 38 that is rotatably mounted on the first output shaft 20, and that in each case can be non-rotatably connected by means of a clutch plate arrangement 40 or a clutch plate arrangement 42, which can be brought into engagement, to the first output shaft 20. The first shift element 24 and the second shift element 26 are here arranged coaxially to the first output shaft 20, wherein the clutch housing portion 38 of the second shift element 26 is mounted in the clutch housing portion 36 of the first shift element 24.

The clutch housing portion 36 of the first shift element 24 is non-rotatably connected to an output-side sun gear 44. The clutch housing portion 38 of the second shift element 26 is non-rotatably connected to the planet gear carrier 28. By closing the clutch plate arrangement 40 or the clutch plate arrangement 42, the output-side sun gear 44 or the planet gear carrier 28 as desired is non-rotatably connected to the first output shaft 20.

The planet gear carrier 28 and the clutch housing portion 38 of the first shift element 24 are non-rotatably connected by means of a rigid clutch arrangement 45 to the input shaft 18, where the clutch housing portion 38 is mounted by means of a first roller bearing 46 on the first output shaft 20. The first output shaft 20 is mounted by means of a second roller bearing 48 on the output side on the housing 12. A third roller bearing 50 is formed on the output side at the housing 12.

An input-side sun gear 52 is non-rotatably arranged on the housing 12, wherein the input-side sun gear 52 is designed as an input-side hollow shaft 54 (that is toothed) through which the input shaft 18 extends coaxially. The input shaft 18 extends coaxially through the input-side hollow shaft 54 and it is non-rotatably connected by means of the rigid clutch arrangement 45 to the planet gear carrier 28 and to the clutch housing portion 38 of the first shift element 24.

The first output shaft 20 is formed as a hollow shaft through which a second output shaft 56 extends, which is non-rotatably connected by means of the rigid clutch arrangement 45 to the input shaft 18.

The power shift transmission 10 is designed as a variable modular transmission system, and it can be designed for different operation modes or adapted to different operation modes by changing or exchanging the gear pairings between input-side sun gear 52 and input-side planet gear 32 or between output-side sun gear 44 and output-side planet gear 34.

Starting from the input side of the power shift transmission, in a first embodiment example, gear pairings with the following relationships between the number of gear teeth are arranged:

The input-side planet gear 32 of the dual-stage planetary gear set 30 engages with the input-side sun gear 52 in a relationship between the number of gear teeth of 50/33.

The output-side planet gear 34 of the dual-stage planetary gear set 30 engages with the output-side sun gear 44 in a relationship between the number of gear teeth of 16/67.

By shifting (opening or closing) the first shift element 24 in the second shift element 26, the following two operation modes can now be achieved for the power shift transmission 10.

By closing the second shift element 26 and opening the first shift element 24, a first operation mode can be achieved, in which the input shaft 18 is directly connected by means of the second shift element 26 to the first output shaft 20, so that the direction of rotation and the rpm of the input shaft 18 and of the first output shaft 20 are identical. The power shift transmission is then operated in the so-called fixed drive mode with a transmission ratio of i=1 and a resulting efficiency of 0.988, which represents a clear optimization in comparison to conventional power shift transmissions of the same classification.

By closing the first shift element 24 and opening the second shift element 26, a second operation mode can be achieved, in which the first output shaft 20 is driven by means of the dual-stage planetary gear set 30, wherein due to the blocking the input-side sun gear 52, the dual-stage planetary gear set 30 rolls around the input-side sun gear 52, and the output occurs by means of the gear pairing of the output-side planet gear 34 and of the output-side sun gear 44 in connection with the first shift element 24, so that the rotation directions of the input shaft 18 and of the first output shaft 20 are identical, and the rpms are different. The power shift transmission is then operated in the so-called gear reduction mode with a transmission ratio of i=1.19 and a resulting efficiency of 0.992, which also represents a clear optimization in comparison to conventional power shift transmissions of the same classification.

Figure 2:
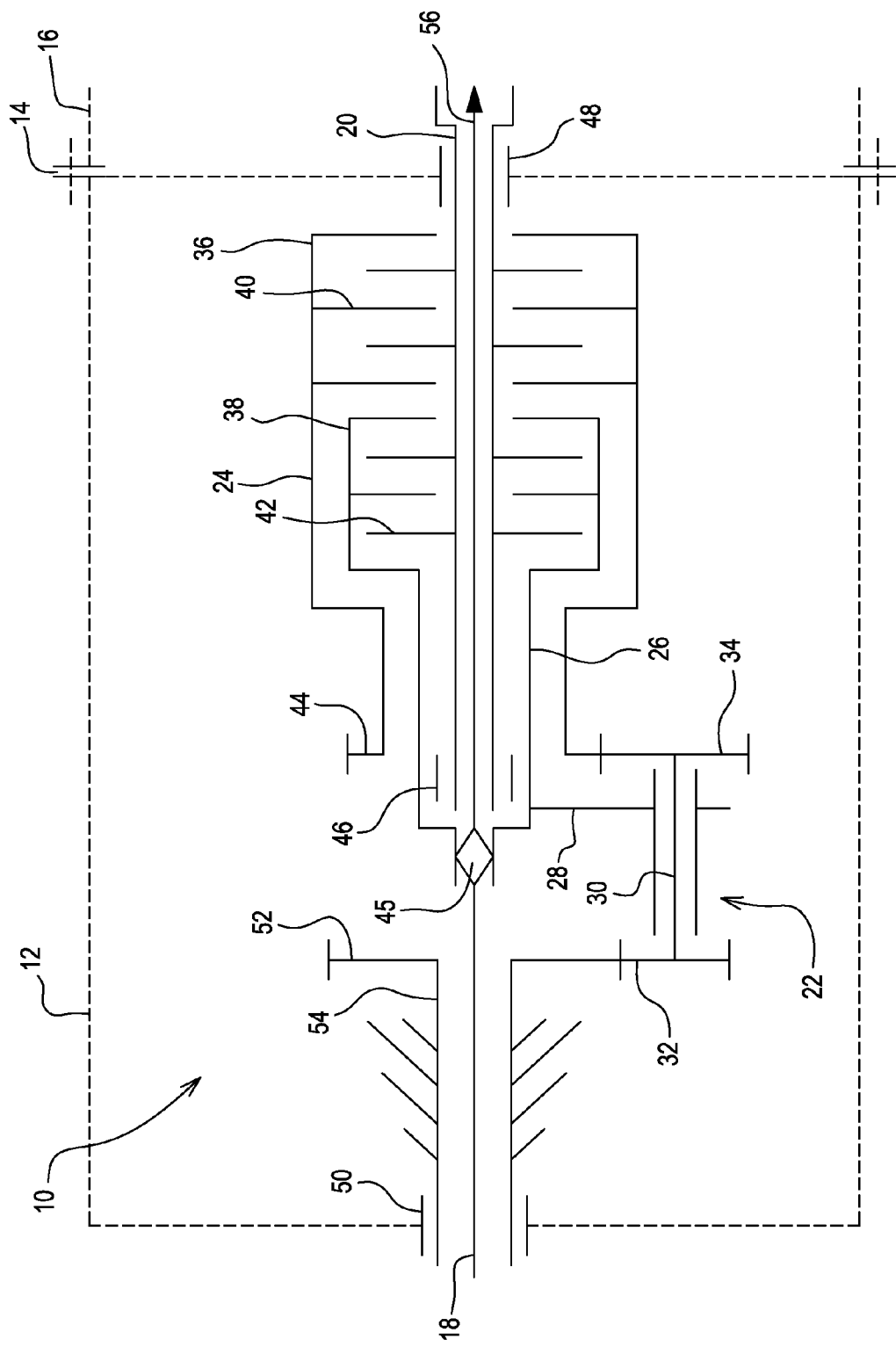
FIG. 2 shows a transmission diagram for a power shift transmission according to the invention in a second embodiment.

In another embodiment example, as represented in FIG. 2, the power shift transmission can be operated in another pairing of the operation modes. The following relationships between the number of gear teeth are then arranged:

The input-side planet gear 32 of the dual-stage planetary gear set 30 engages with the input-side sun gear 52 in a relationship between the number of gear teeth of 22/61.

The output-side planet gear 34 of the dual-stage planetary gear set 30 engages with the output-side sun gear 44 in a relationship between the number of gear teeth of 35/48.

By shifting (opening or closing) the first shift element 24 in the second shift element 26, the following two operation modes can now be achieved for the power shift transmission 10.

By closing the second shift element 26 and opening the first shift element 24, a first operation mode can be achieved, in which the input shaft 18 is directly connected by means of the second shift element 26 to the first output shaft 20, so that the direction of rotation and the rpm of the input shaft 18 and of the first output shaft 20 are identical. The power shift transmission is then also operated in the fixed drive mode with a transmission ratio of i=1 and a resulting efficiency of 0.988.

By closing the first shift element 24 and opening the second shift element 26, a second operation mode can be achieved, in which the first output shaft 20 is operated by means of the dual-stage planetary gear set 30, wherein due to the blocking the input-side sun gear 52, the dual-stage planetary gear set 30 rolls around the input-side sun gear 52, and the output occurs by means of the gear pairing of the output-side planet gear 34 and the output-side sun gear 44 in connection with the first shift element 24, so that the direction of rotation of the input shaft 18 and of the first output shaft 20 can be different. The power shift transmission is then operated in the so-called reverse mode with a transmission ratio of i=−0.98 and a resulting efficiency of 0.918.

Figure 3:
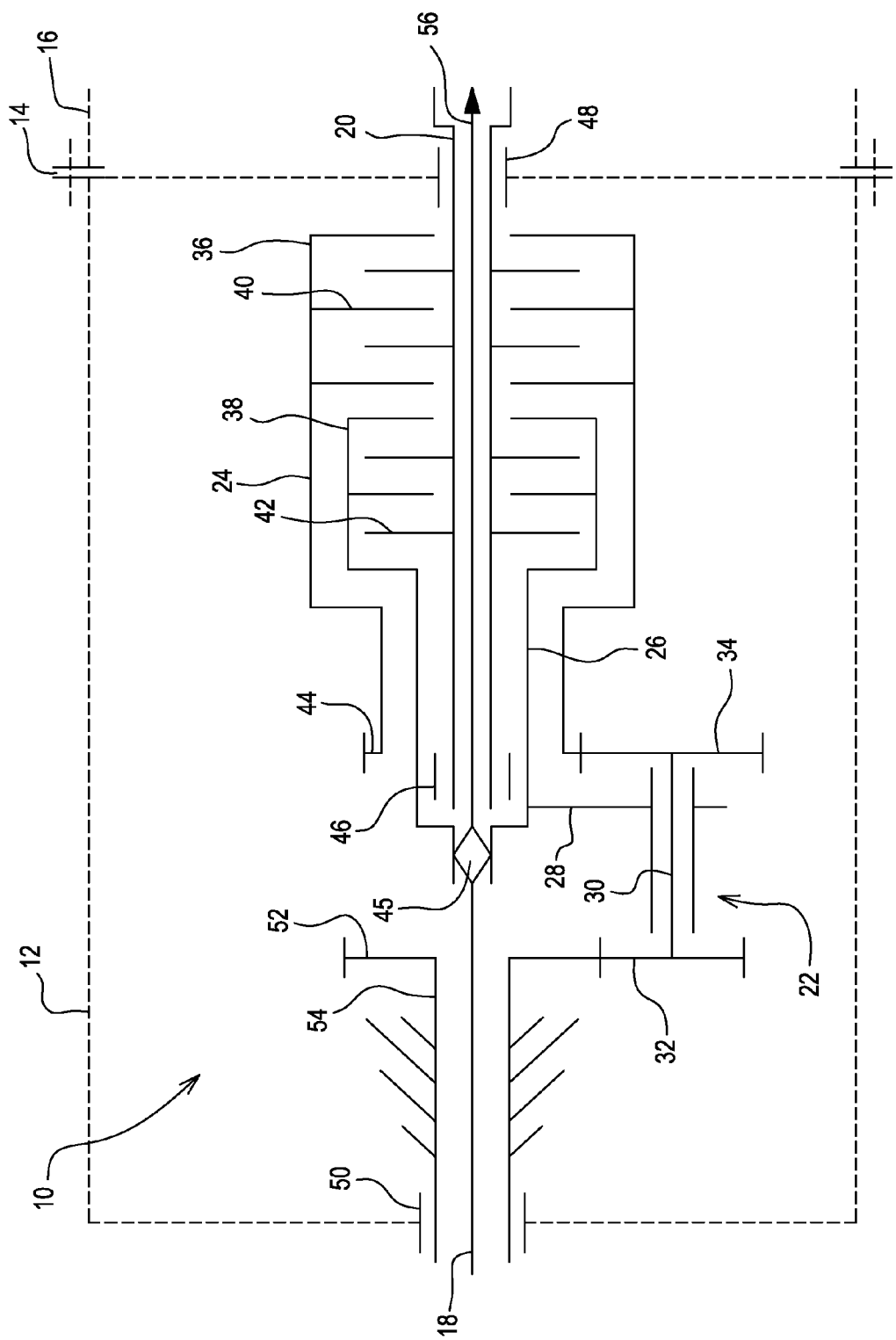
FIG. 3 shows a transmission diagram for a power shift transmission according to the invention in a third embodiment.

In another different embodiment example, as represented in FIG. 3, the power shift transmission can again be operated with yet another pairing of the operation modes. The following relationships between the number of gear teeth are then arranged:

The input-side planet gear 32 of the dual-stage planetary gear set 30 engages with the input-side sun gear 52 in a relationship between the number of gear teeth of 44/40.

The output-side planet gear 34 of the dual-stage planetary gear set 30 engages with the output-side sun gear 44 in a relationship between the number of gear teeth of 46/38.

By shifting (opening or closing) the first shift element 24 and the second shift element 26, the following two operation modes can now be achieved for the power shift transmission 10.

By closing the second shift element 26 and opening the first shift element 24, a first operation mode can be achieved, in which the input shaft 18 is directly connected to the first output shaft 20 by means of the second shift element 26, so that the direction of rotation and the rpm of the input shaft 18 and of the first output shaft 20 are identical. The power shift transmission is then also operated in the fixed drive mode with a transmission ratio of i=1 and a resulting efficiency of 0.989.

By closing the first shift element 24 and opening the second shift element 26, a second operation mode can be achieved, in which the first output shaft 20 is driven by means of the dual-stage planetary gear set 30, wherein due to the blocking the input-side sun gear 52, the dual-stage planetary gear set 30 rolls around the input-side sun gear 52 and the output occurs by means of the gear pairing of the output-side planet gear 34 and the output-side sun gear 44 in connection with the first shift element 24, so that the rotation directions of the input shaft 18 and of the first output shaft 20 are identical, and a relatively high reduction ratio, that is to say a much lower rpm, is achieved for the first output shaft. The power shift transmission is then operated in the so-called crawler gear mode with a transmission ratio of i=9.84 and a resulting efficiency of 0.727.

Thus, three different pairings of operation modes become possible, wherein, in each operation mode, one of the first shift element 24 and the second shift element 26 is connected in each case.

Although the invention was only described in reference to one embodiment example, many different alternatives, modifications and variants that fall within the scope of the present invention are apparent to the person skilled in the art in the light of the above description as well as the drawing.

The invention claimed is:

1. A power shift transmission (10) comprising:
 an input shaft (18);
 a first output shaft (20) arranged coaxially to the input shaft (18); and
 a planetary transmission (22) having a planet gear carrier (28), which is connected to the input shaft (18), and a dual-stage planetary gear set (30), wherein the dual-stage planetary gear set (30) has an input side with an input-side sun gear (52) and has an output side with an output-side sun gear (44), and at least a first shift element (24) and a second shift element (26);
 wherein the first output shaft (20) can be connected to the output-side sun gear (44) of the dual-stage planetary gear set (30) by means of the first shift element (24) and the first output shaft (20) can be directly connected to the input shaft (18) by means of the second shift element (26), wherein the input-side sun gear (52) of the dual-stage planetary gear set (30) is non-rotatably connected to a housing (12) of the power shift transmission (10).

2. The power shift transmission (10) according to claim 1, characterized in that a direct connection of the output-side sun gear (44) or of the input shaft (18) to the first output shaft (20) can be established in each case by closing a corresponding shift element (24, 26) of the first shift element (24) and the second shift element (26), and for each operation mode of the power shift transmission (10), a shift element (24, 26) of the first shift element (24) and the second shift element (26) is closed in each case.

3. The power shift transmission (10) according to claim 1, characterized in that the input-side sun gear (52) is arranged coaxially to the input shaft (18) and the input shaft (18) extends through the input-side sun gear (52).

4. The power shift transmission (10) according to claim 1, characterized in that the first output shaft (20) is designed as a hollow shaft through which a second output shaft (56) connected to the input shaft (18) extends.

5. The power shift transmission (10) according to claim 1, characterized in that the first shift element (24) is a clutch and the second shift element (26) is a clutch, wherein the clutches on their input side are non-rotatably connected to the output-side sun gear (44) or are non-rotatably connected to the planet gear carrier (28), and wherein the clutches on their output side are non-rotatably connected to the first output shaft (20).

6. The power shift transmission (10) according to claim 1, characterized in that the power shift transmission (10) can be operated in four operation modes, wherein the four operation modes comprise at least a fixed drive mode, a gear reduction mode, a crawler gear mode, and a reverse mode.

7. The power shift transmission (10) according to claim 6, characterized in that the dual-stage planetary gear set (30), the input-side sun gear (52), and the output-side sun gear (44) are designed so that the power shift transmission (10) can be operated in the fixed drive mode or in the gear reduction mode.

8. The power shift transmission (10) according to claim 6, characterized in that the dual-stage planetary gear set (30), the input-side sun gear (52) and the output-side sun gear (44) are designed so that the power shift transmission (10) can be operated in the fixed drive mode or in the crawler gear mode.

9. The power shift transmission (10) according to claim 6, characterized in that the dual-stage planetary gear set (30) the input-side sun gear (52), and the output-side sun gear (44) are designed so that the power shift transmission (10) can be operated in the fixed drive mode or in the reverse mode.

\* \* \* \* \*